INVENTOR.
HENRY T. WINCHEL
ATTORNEY

Patented Jan. 23, 1951

2,539,001

UNITED STATES PATENT OFFICE 2,539,001

ECHO RANGING APPARATUS

Henry T. Winchel, Roscoe, Calif., assignor to Bendix Aviation Corporation, South Bend, Ind., a corporation of Delaware Application July 2, 1947, Serial No. 758,513

2 Claims. (Cl. 177—352)

This invention relates to echo ranging apparatus for ascertaining distances from the time required for waves to traverse the distances and be reflected back to the starting point, and is particularly useful in determining the depth of water with sonic or supersonic waves.

An object of the invention is to simplify and increase the reliability of echo ranging apparatus.

Another object is to provide echo ranging apparatus capable of measuring extremely short distances.

The manner in which the foregoing objects are achieved, together with other more specific objects and features of the invention will appear from the detailed description to follow.

Briefly, echo ranging apparatus in accordance with the present invention incorporates a shock-excited transducer for converting electric oscillations into pressure waves and vice versa, an oscillatory circuit coupled to the transducer, an amplifier for magnifying oscillations produced in the oscil'atory circuit by the transducer in response to echoes, and recording apparatus for indicating in terms of distance the time interval between the transmission of the pressure wave and the return of the echo.

The invention further resides in circuit details that increase the efficiency of energy transfer between the transducer and the oscillatory circuit and that rapidly damp the train of shock induced oscillations. This latter feature is important in echo ranging over very short distances, because the shock-induced oscillations must be extinguished by the time the echo is received, else the echo-induced oscillations cannot be recognized.

Figure 1:
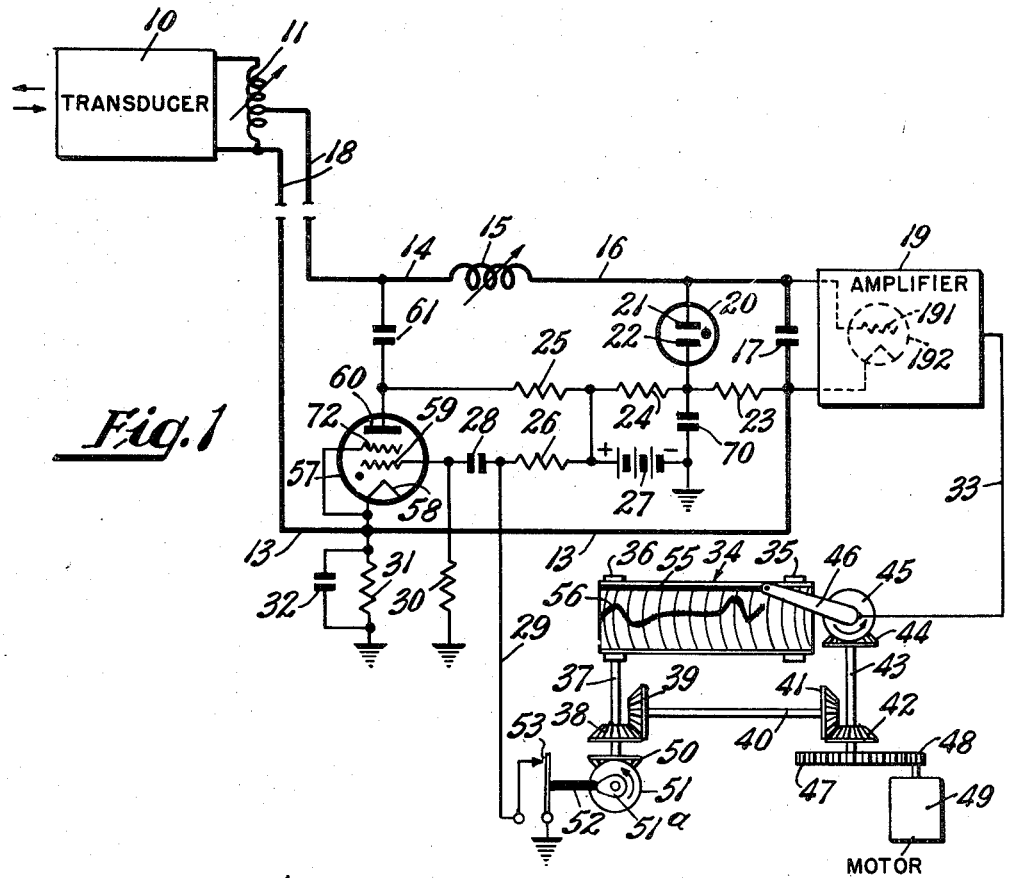
Fig. 1 is a schematic diagram of a system in accordance with the invention.

Referring to Fig. 1, the system therein disclosed comprises a transducer 10 which is coupled by a transformer 11 to a transmission line 18. The other end of the transmission line 18 connects to a series circuit consisting of a conductor 13, a condenser 17, a conductor 16, an inductance 15, and a conductor 14.

The transducer 10, when shock-excited, transmits compressional waves of the frequency to which it is tuned. Likewise, received compressional waves excite the transducer 10 to develop in the oscillatory circuit, shown in heavy lines (including the transducer 10, transformer 11, transmission line 18, the conductors 13, 14, and 16, the inductance 15, and the condenser 17), waves of the same frequency, whereby the amplitude of the received waves is substantially greater than it would otherwise be. The oscillations in the heavy line circuit produce a potential drop across the condenser 17, which is amplified in an amplifier 19 and applied over a conductor 33 to a rotating hand 46 having a stylus on the outer end thereof which moves across a record strip 34. When potential is applied to the stylus it produces a mark on the record strip. As shown in Fig. 1, the stylus ordinarily produces two lines, 55 and 56, respectively, on the record strip, the line 55 being a base line which is straight, and the line 56 being a depth line (in the case of a depth recorder) which is produced in response to received echoes and indicates the depth. The record strip 34 is moved at a constant rate of speed by unwinding it from a roll 35 onto a roll 36. To this end the roll 36 is shown driven by a shaft 37 having a bevel gear 38 thereon which is driven by a bevel gear 39 on a shaft 40. Shaft 40 in turn has a bevel gear 41 thereon which meshes with and is driven by a bevel gear 42 on a shaft 43. Shaft 43 is driven from a motor 49 through a pinion 48 on the motor shaft and a gear 47 on the shaft 43. The motor 49 is preferably of the constant speed type and rotates the hand 46 in addition to feeding the record strip. Thus the hand 46 may be coupled by bevel gears 45 and 44 to the shaft 43.

The shaft 37 also carries a bevel gear 50 meshing with a bevel gear 51, which carries a cam 51a which acts against a cam-follower 52 to close and open a pair of contacts 53 in synchronism with the movement of the hand 46, to control the simultaneous transmission of a signal from the transducer 10 and the energization of the stylus to produce the base line 55.

To shock excite the transducer, there is provided a gaseous electron discharge tube 57 having a cathode 58 (heated in the usual manner by a heater not shown), a control grid 59, a shield grid 72, and an anode 60. The cathode 58 is connected directly to the conductor 13, and the anode 60 is connected through a condenser 61 to the conductor 14. The anode 60 is also connected through a resistor 25 to the positive terminal of a source of anode potential 27. This same positive terminal is connected through another resistor 26 to the switch contacts 53, and a condenser 28 is inserted between the resistor 26 and the control grid 59 of the tube 57. A grid leak resistor 30 is connected between the grid 59 and ground. The negative terminal of the source 27 is grounded, and the cathode 58 is connected to ground through a cathode biasing resistor 31 by-passed by a condenser 32.

Normally, the control grid 59 of the tube 57 and the plate of condenser 28 that is connected to the grid are at ground potential, whereas the other plate of condenser 28 is at the full positive potential of the source 27. Likewise, the anode 60 of the tube is at the full positive potential of the source 27, but the grid 59, when at ground potential, is sufficiently negative with respect to the cathode 58 to prevent flow of current through the tube despite the high positive potential on the anode 60. When the rotation of the cam 51a closes the contacts 53, the plate of condenser 28 that was formerly at the high positive potential of the source 27 is suddenly reduced to ground potential. This releases a negative charge from the plate of the condenser 28 that is connected to the grid 59, which charge flows to ground through the grid leak resistor 30 and increases the negative potential of the grid, which has no effect on the conductivity of the tube.

However, when the contacts 53 break, the condenser 28 is recharged from the source 27 through the resistor 26, causing a flow of current through the grid resistor 30 which makes the grid 59 sufficiently positive to cause the tube 57 to become conductive or to "fire." When the tube 57 fires, it connects the charged condenser 61 directly between the conductors 13 and 14, thereby suddenly applying the full potential of the condenser thereto and energizing the transducer 10, causing it to transmit a damped train of compressional waves. It is to be understood the transducer is preferably so designed that it is mechanically tuned to vibrate at the natural frequency of the electrical system.

At the same time, the oscillations in the heavy line circuit produce a potential across the condenser 17 which is amplified in the amplifier 19 and applied to the rotating stylus on the hand 46 to produce another increment in the base line 55.

The tube 57 immediately quenches because the anode potential drops to a low value due to the drop in resistor 25, and the current flow through the biasing resistor 31 drives the cathode 58 positive with respect to the grid 59.

Figure 2:
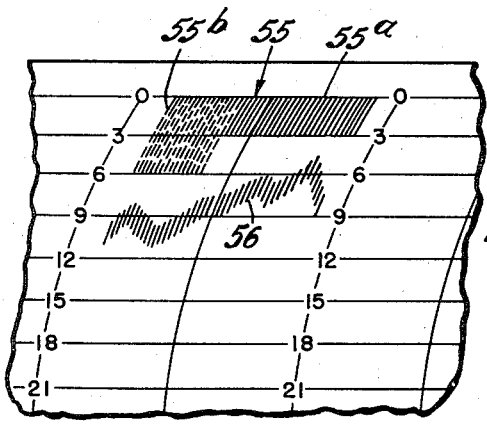
Fig. 2 is an enlarged view of a portion of a record produced with the invention, showing the effect of the damping feature of the invention.

Referring to Fig. 2, it will be observed that the base line 55 is made up of a plurality of arcs 55a extending transversely across the record strip 34, the lengths of the arcs 55a depending upon the duration of the oscillations following shock excitation of the circuit in the manner described.

It will be noted from inspection of Fig. 2 that the arcs 55a extend from the zero depth line on the strip 34 to the three-foot line. The distance between the zero and the three-foot lines represents the distance traveled by the stylus in the time required for the compressional wave in water to travel six feet, i. e. travel three feet to the bottom or other reflective surface and then three feet back to the transducer. It is obvious from inspection of Fig. 2 that if the depth of the water becomes less than three feet, the position of the depth line 56 will be lost in the base line 55, and the narrower the base line 55 can be made, the shallower are the depths that the instrument can record. Hence it is desirable to reduce the time that the oscillatory circuit "rings" after being excited.

In accordance with the present invention, a substantial reduction in the ringing time of the circuit is effected by a damping circuit including a cold electrode gaseous discharge tube 20 which is connected in series with resistor 23 across the condenser 17. The tube 20 may be a conventional neon lamp having two electrodes 21 and 22, with the electrode 21 connected to the conductor 16, and the electrode 22 connected to the conductor 13 through the resistor 23, and to ground through a condenser 70, and to the plus terminal of the source 27 through a resistor 24. The resistors 24 and 23 together constitute a D. C. voltage divider for maintaining a constant potential on the electrode 22 different from the potential of the electrode 21. This difference in potential constitutes a biasing potential, making electrode 22 more positive than electrode 21.

In operation, the potential impressed upon the electrode 22 by means of the resistors 24 and 23 and the source 27 is such that the tube 20 breaks down or fires during the first cycle of oscillations following firing of the tube 57. After it has fired, the tube 20 offers a relatively low resistance (in series with the condensers 70 and 32) connected across the condenser 17. This substantially reduces the Q and increases the decrement of the circuit.

Since the electrode 22 is positively biased with respect to electrode 21, the tube 20 breaks down during those half cycles when conductor 16 is negative with respect to conductor 13. During the other half cycles when conductor 16 is positive with respect to conductor 13, the grid 191 of the first tube 192 of the amplifier 19 becomes conductive and has a damping effect on the oscillations. The net result is that the ringing time of the circuit is cut substantially. In other words, referring to Fig. 2, the relatively short arcs 55a representing the width of the base line 55 when the tube 20 is provided as described are substantially only half as long as the arcs 55b, shown in dotted lines, which are produced if the tube 20 is removed from the circuit.

In practice, the transducer 10 must usually be more or less remotely positioned from the major portion of the apparatus, and it is desirable that the transmission line 18 connecting the transducer to the rest of the circuit be of low impedance. The transformer 11, shown as consisting of a variable, tapped inductance element permits electrical tuning of the transducer 10 and improves the impedance match between the transducer and the low-impedance transmission line 18.

The low-impedance line 18 feeds into the series, tuned circuit consisting of inductance 15 and condenser 17, which series circuit has a low impedance at resonance. Therefore, relatively efficient coupling is provided between the transducer 10 and the amplifier 19 during reception of echoes.

On the other hand, when the condenser 17 is shunted by the resistance of the tube 20 and tube 192, during transmission, the impedance looking from the line 18 into the conductors 13 and 14 is much higher, and the coupling between the transducer 10 and the amplifier 19 is much less efficient.

A circuit designed for operation at a frequency of 50,000 cycles per second may have the following circuit constants:

| | |
|---|---|
| Inductance 15 | 30 to 38 millihenries |
| Condenser 17 | .0003 mfd. |
| Condenser 61 | .25 mfd. |
| Condenser 28 | .0001 mfd. |
| Condenser 32 | .5 mfd. |
| Condenser 70 | .01 mfd. |
| Resistor 25 | 100,000 ohms |
| Resistor 26 | 100,000 ohms |
| Resistor 30 | 100,000 ohms |
| Resistor 31 | 2,000 ohms |
| Resistor 24 | 75,000 ohms |
| Resistor 23 | 10,000 ohms |
| Potential source 27 | 250 volts |

The transducer 10 may be of the piezo crystal type having an impedance equivalent to a capacity of .00082 mfd. in series with 2000 ohm resistance, and the transformer 11 may have an inductance range of from 9 to 15½ millihenries, and a ration of 12 to 1.

The tube 57 may be a thyratron having a peak anode current of approximately five amperes and firing at any positive potential on the grid 59 (with respect to cathode) with an anode potential of 250 volts.

For details of a recording apparatus that may be used, reference is made to the copending application of Ryan and Levine, Serial No. 579,872, filed February 26, 1945, and issued March 21, 1950, as Patent No. 2,501,236.

Although for the purpose of explaining the invention, a particular embodiment thereof has been shown and described, obvious modifications will occur to a person skilled in the art, and I do not desire to be limited to the exact details shown and described.

I claim:

1. Echo ranging apparatus comprising: a transducer for converting electrical oscillations into traveling waves and for converting traveling waves into electrical oscillations; indicating means; means including reactance elements defining a closed tuned circuit of substantial Q; means for periodically shock-exciting said transducer; means coupling said tuned circuit to said transducer; means coupling said tuned circuit to said indicating means; a gaseous discharge tube and a resistance load connected in series with each other and in shunt to one of said reactance elements, said tube becoming conductive in response to a predetermined potential; and means other than said exciting means for imposing on said tube a priming potential less than said predetermined potential.

2. Apparatus in accordance with claim 1 in which said means for imposing a priming potential on said gaseous discharge tube comprises a source of potential, a resistance element and said resistance load connected in a series circuit.

HENRY T. WINCHEL.

REFERENCES CITED

The following references are of record in the file of this patent:

UNITED STATES PATENTS

| Number | Name | Date |
|---|---|---|
| 1,858,931 | Langevin et al. | May 17, 1932 |
| 1,972,889 | Hayes | Sept. 11, 1934 |
| 2,333,688 | Shepard | Nov. 9, 1943 |
| 2,405,575 | Hayes et al. | Aug. 13, 1946 |
| 2,428,799 | Hayes et al. | Oct. 14, 1947 |